(12) United States Patent
Nomura (10) Patent No.: US 7,059,309 B2
(45) Date of Patent: Jun. 13, 2006

(54) EXHAUST GAS RECIRCULATION CONTROLLER

(75) Inventor: Mitsuhiro Nomura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/057,166

(22) Filed: Feb. 15, 2005

(65) Prior Publication Data

US 2005/0193995 A1    Sep. 8, 2005

(30) Foreign Application Priority Data

Mar. 2, 2004    (JP) ............... 2004-057944

(51) Int. Cl.
*F02B 47/08*    (2006.01)
*F02B 47/04*    (2006.01)
(52) U.S. Cl. .............................. 123/568.14; 123/568.11
(58) Field of Classification Search ........... 123/568.14, 123/568.11; 60/274, 287, 288
See application file for complete search history.

(56) References Cited

U.S. PATENT DOCUMENTS 6,810,866 B1 * 11/2004 Geiser .................. 123/568.14
6,917,874 B1 *  7/2005 Uchida et al. ............. 701/108

FOREIGN PATENT DOCUMENTS

| JP | 07-103050 | 4/1995 |
| JP | 10-299557 | 11/1998 |
| JP | 11-013502 | 1/1999 |
| JP | 11-066458 | 1/1999 |
| JP | 11-082134 | 3/1999 |
| JP | 2001-323831 | 11/2001 |

* cited by examiner

*Primary Examiner*—Mahmoud Gimie
(74) *Attorney, Agent, or Firm*—Kenyon & Kenyon LLP (57) ABSTRACT

An ECU varies a period during which an intake valve and an exhaust valve are both simultaneously open by setting a target overlap angle OVP to be equal to a limit overlap angle OVL until the coolant temperature becomes higher than a reference temperature to reduce the internal EGR amount. This prevents combustion deterioration in a gasoline engine.

20 Claims, 4 Drawing Sheets

EXHAUST GAS RECIRCULATION CONTROLLER

CROSS-REFERENCE TO RELATED APPLICATIONS

This application is based upon and claims the benefit of priority from prior Japanese Patent Application No. 2004-057944, filed on Mar. 2, 2004, the entire contents of which are incorporated herein by reference.

BACKGROUND OF THE INVENTION

The present invention relates to an exhaust gas recirculation (EGR) controller for recirculating some of exhaust gas to combustion chambers of an internal combustion engine.

When an anomaly in fuel injection is detected in a typical internal combustion engine, fail control is performed to cope with the anomaly. For example, Japanese Laid-Open Patent Publication No.10-299557 describes that operation of an internal combustion engine is immediately interrupted when too much fuel is injected from a fuel injection valve. Further, the publication describes that when the appropriate fuel injection pressure cannot be obtained due to a fuel pump anomaly or a clogged filter, it is preferable that the internal combustion engine continue to operate in an engine safety mode.

Internal combustion engines include so-called port injection engines, which inject fuel into an intake port, and so-called direct injection engines, which inject fuel into combustion chambers. Injected fuel is difficult to vaporize when the engine temperature is still low, for example, when starting the engine. Fuel vaporization is more difficult in port injection engines than in direct injection engines.

In order to enhance the vaporization of injected fuel, for example, the period during which an intake valve and an exhaust valve are both simultaneously open (valve overlap period) is set longer during cold operation of the internal combustion engine than during normal operation. This increases the amount of exhaust gas returned from an exhaust passage to a combustion chamber and raises the temperature in the combustion chamber with the heat of the EGR gas. As a result, the vaporization of the injected fuel is enhanced. By drawing EGR gas into the combustion chamber, fuel vaporization is enhanced and a relatively satisfactory combustion condition is maintained even when fuel is directly injected into a combustion chamber during cold operation.

When the fuel injection pressure is low, relatively large fuel droplets are injected. Such large fuel droplets are difficult to vaporize. If some of exhaust gas is returned (recirculated) to the combustion chamber when the fuel injection pressure is low, the recirculated gas (EGR gas) would enhance the vaporization of the fuel droplets. However, the proportion of the amount of fresh air (oxygen) required for combustion in the combustion chamber would decrease. This would deteriorate combustion in the combustion chamber. As a result, misfire or engine speed fluctuation may occur.

This problem is particularly noticeable in direct injection engines but also arises in port injection engines. Further, this problem occurs not only in an engine provided with an internal EGR function, in which EGR gas is drawn into the combustion chamber by prolonging the valve overlap period, but also occurs in an engine provided with an external EGR function, in which some of exhaust gas in an exhaust passage is returned to an intake passage through an EGR pipe connecting the exhaust passage to the intake passage.

SUMMARY OF THE INVENTION

It is an object of the present invention to provide an Exhaust gas recirculation controller for an internal combustion engine capable of driving the engine in an engine safety mode without promoting combustion deterioration even when the fuel injection pressure drops.

One aspect of the present invention is an exhaust gas recirculation controller for an internal combustion engine having a fuel injection valve for injecting fuel, in which the exhaust gas recirculation controller recirculates some of exhaust gas to a combustion chamber. The exhaust gas recirculation controller includes a detection means for detecting fuel injection pressure of the fuel injection valve. A restriction means adjusts the amount of exhaust gas returned to the combustion chamber. The restriction means restricts the amount of returned exhaust gas when the detected fuel injection pressure is lower than a target injection pressure.

Another aspect of the present invention is an exhaust gas recirculation controller for an internal combustion engine having a fuel injection valve for injecting fuel, in which the exhaust gas recirculation controller recirculates some of exhaust gas to a combustion chamber. The exhaust gas recirculation controller includes a pressure sensor for detecting fuel injection pressure of the fuel injection valve. A restriction unit adjusts the amount of exhaust gas returned to the combustion chamber. The restriction unit restricts the amount of returned exhaust gas when the detected fuel injection pressure is lower than a target injection pressure.

A further aspect of the present invention is an EGR controlling method for recirculating some of exhaust gas to a combustion chamber of an internal combustion engine having a fuel injection valve for injecting fuel. The method includes detecting fuel injection pressure of the fuel injection valve, and adjusting the amount of exhaust gas returned to the combustion chamber in accordance with the detected fuel injection pressure. The amount of returned exhaust gas is decreased when the detected fuel injection pressure is lower than a target injection pressure.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A controller according to a preferred embodiment of the present invention will now be described with reference to FIGS. 1 to 5.

Figure 1:
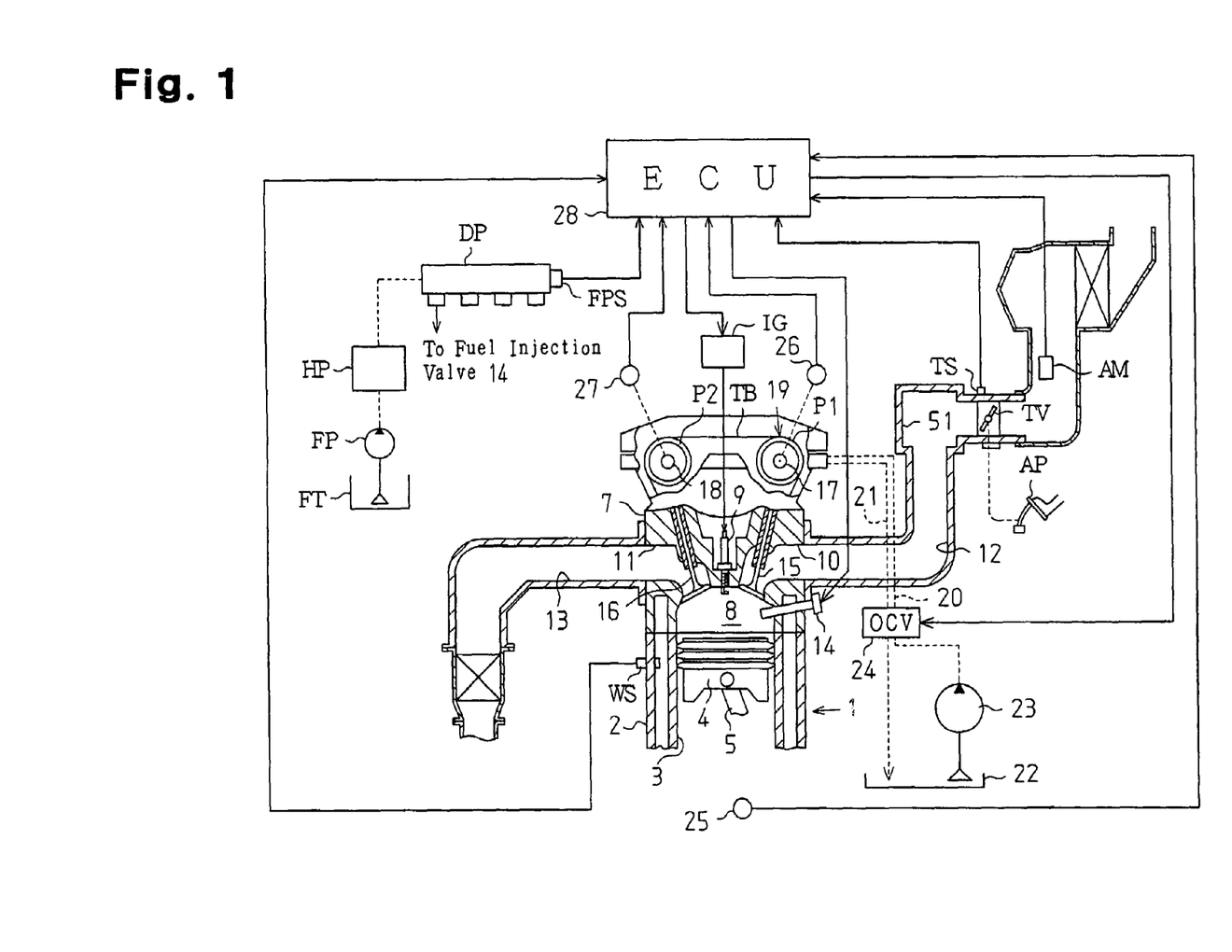
FIG. 1 is a block diagram of an internal combustion engine incorporating a controller according to a preferred embodiment of the present invention.

FIG. 1 shows an internal combustion engine 1 mounted on an automobile. A cylinder block 2 has a plurality of cylinders 3 (only one shown in FIG. 1). A piston 4 is retained in each cylinder 3. The piston 4 is linked to a crankshaft (not shown) by a connecting rod 5. The connecting rod 5 converts reciprocation of the piston 4 in the cylinder 3 into rotation of the crankshaft.

A cylinder head 7 is attached to the top of the cylinder block 2. A combustion chamber 8 is defined in each cylinder 3 between the upper end of the piston 4 and the cylinder head 7. An ignition plug 9 is attached to the cylinder head 7 in correspondence with each cylinder 3. For each cylinder 3, the cylinder head 7 has an intake port 10 and an exhaust port 11 connected to the combustion chamber 8. The intake port 10 and the exhaust port 11 are connected to an intake passage 12 and an exhaust passage 13, respectively. A fuel injection valve 14 is attached to the cylinder head 7 for each combustion chamber 8 to directly inject fuel into the combustion chamber 8. Each fuel injection valve 14 is supplied with fuel from a fuel tank FT through a fuel supply system including a feed pump FP, a cam-driven high pressure pump HP, and a delivery pipe DP.

Each intake port 10 is provided with an intake valve 15. Each exhaust port 11 is provided with an exhaust valve 16 for opening and closing the exhaust port 11. Each intake valve 15 and each exhaust valve 16 respectively operate in association with the rotation of an intake camshaft 17 and an exhaust camshaft 18. More particularly, the intake valves 15 and the exhaust valves 16 respectively open and close the associated intake ports 10 and exhaust ports 11 in accordance with the rotational phase of cams (not shown) provided on the intake camshaft 17 and the exhaust camshaft 18.

The intake camshaft 17 and exhaust camshaft 18 are provided with timing pulleys P1 and P2, respectively. The timing pulleys P1 and P2 are connected to the crankshaft by a timing belt TB. When the crankshaft rotates twice, the timing pulleys P1 and P2 rotate once. During operation of the internal combustion engine 1, the torque of the crankshaft is transmitted to the intake camshaft 17 and the exhaust camshaft 18 by the timing belt TB and the timing pulleys P1 and P2. The intake valve 15 and the exhaust valve 16 are driven at a predetermined timing synchronously with the rotation of the crankshaft, that is, in accordance with the reciprocation of the piston 4.

In the preferred embodiment, the timing pulley P1 of the intake camshaft 17 is provided with a variable intake-valve-timing mechanism (IN-VVT mechanism) 19. The IN-VVT mechanism 19 changes the relative rotational phase of the timing pulley P1 and the intake camshaft 17 with respect to the crankshaft with hydraulic pressure. The opening and closing timing, which is an operation characteristic of the intake valve 15, is varied continuously in accordance with the change of the relative rotational phase.

The IN-VVT mechanism 19 includes an advance-side hydraulic pressure passage 20 and a retard-side hydraulic pressure passage 21, both of which are connected to the timing pulley P1. For advancing the relative rotational phase of the intake camshaft 17, oil is supplied to the timing pulley P1 via the advance-side hydraulic pressure passage 20. For retarding the relative rotational phase of the intake camshaft 17, oil is supplied to the timing pulley P1 via the retard-side hydraulic pressure passage 21. Oil contained in an oil pan 22 is pumped by an oil pump 23 and supplied to an oil control valve (OCV) 24. The OCV 24 is a so-called linear solenoid valve, which varies the duty ratio of voltage applied to an incorporated electromagnetic solenoid to selectively supply oil to either the advance-side hydraulic pressure passage 20 or the retard-side hydraulic pressure passage 21, or to alter the feeding speed of oil to the passage 20 or 21. The rotational phase of the cam of the intake camshaft 17 relative to the crankshaft is changed at an appropriate speed by the IN-VVT mechanism 19. This varies the operation timing of the intake valve 15.

In the internal combustion engine 1, an air fuel mixture of intake air from the intake passage 12 and fuel injected from the fuel injection valve 14 is formed in the combustion chamber 8. The air fuel mixture is ignited when an igniter IG applies high voltage to the ignition plug 9 to generate engine output. Combustion gas (exhaust gas) resulting from the combustion is discharged into the exhaust passage 13.

A throttle valve TV driven when a driver depresses an accelerator pedal AP is located at an upstream position in the intake passage 12. The amount of air drawn into the combustion chamber 8 is adjusted by driving the throttle valve TV.

As shown in FIG. 1, a crank angle sensor 25 is arranged near the crankshaft (not shown). The crank angle sensor 25 detects the rotational phase of the crankshaft (crank angle). An ECU 28 detects the engine speed NE of the internal combustion engine 1 (crankshaft) based on a detection signal from the crank angle sensor 25.

An intake cam angle sensor 26 is arranged near the intake camshaft 17. The ECU 28 detects the rotational phase of the intake camshaft 17 (cam angle) based on detection signals from the intake cam angle sensor 26 and the crank angle sensor 25.

An exhaust cam angle sensor 27 is arranged near the exhaust camshaft 18. The ECU 28 detects the rotational phase of the exhaust camshaft 18 (cam angle) based on detection signals from the exhaust cam angle sensor 27 and the crank angle sensor 25.

A throttle sensor TS is arranged near the throttle valve TV in the intake passage 12 to detect the open degree of the throttle valve TV. An airflow meter AM is located upstream from the throttle valve TV to generate a detection signal in accordance with the intake air amount Qa, or the amount of air drawn into the internal combustion engine 1 (into the cylinder 3). The ECU 28 detects the intake air amount Qa based on the detection signal from the airflow meter AM.

The cylinder block 2 is provided with a coolant temperature sensor WS. The ECU 28 detects the coolant temperature, or temperature of the internal combustion engine 1, based on a detection signal from the coolant temperature sensor WS.

The delivery pipe DP is provided with a pressure sensor FPS, which generates a detection signal according to the fuel injection pressure of the fuel injection valve 14. The ECU 28 determines the fuel injection pressure of the fuel injection valve 14 based on the detection signal of the pressure sensor FPS.

The ECU 28 executes various controls for the internal combustion engine 1, including ignition timing control, fuel injection amount control, and control of the intake valve 15 according to the phase control by the IN-VVT mechanism 19. The ECU 28 also functions as a means for restricting the amount of exhaust gas returned to the combustion chamber 8 (EGR amount). In one embodiment, the ECU 28 is a microcomputer including a central processing unit (CPU), which performs analysis or calculation for restricting the internal EGR amount in accordance with the coolant temperature and the fuel injection pressure.

The ECU 28 includes a read only memory (ROM), in which various programs and registered information such as maps are stored, a random access memory (RAM) for temporarily storing determination or calculation results of the CPU, a backup RAM for storing data such as the calculation results and the registered information after the internal combustion engine 1 stops running, an input interface, and an output interface.

The input interface of the ECU 28 is provided with detection signals from the crank angle sensor 25, the intake cam angle sensors 26 and 27, the coolant temperature sensor WS, the throttle sensor TS, the airflow meter AM, and the pressure sensor FPS. Based on these detection signals, the ECU 28 detects operation conditions of the internal combustion engine 1, such as the crank angle of the crankshaft, the cam angle of the intake camshaft 17, the cam angle of the exhaust camshaft 18, the coolant temperature of the internal combustion engine 1, the throttle open degree of the throttle valve TV, and the intake air amount Qa of the air drawn into the cylinder 3.

The ECU 28 determines, based on the detection signal provided from the pressure sensor FPS, if any anomaly (e.g. clogging or leakage) has occurred in the fuel supply system and if the fuel injection pressure has become lower than a reference injection pressure. The reference injection pressure is set at a value enabling optimal vaporization of the fuel injected from the fuel injection valve 14.

The ECU 28 is connected to the fuel injection valve 14, the OCV 24, and the igniter IG via the output interface and various drive circuits. In accordance with the detection signals from the above-mentioned sensors and the control programs and initial data stored in the ROM, the ECU 28 controls the fuel injection valve 14, the OCV 24, and the igniter IG. That is, the ECU 28 controls the OCV 24 to vary the operation timing of the intake valve 15 as required.

Operation timing control for the intake valve 15 that is executed by the ECU 28 will now be described.

The ECU 28 determines the valve overlap angle (target overlap angle OVP) required by the internal combustion engine 1 in accordance with the actual valve overlap angle (actual overlap angle OVR) from the actual operation timings of the intake valve 15 and exhaust valve 16 (actual operation timing). The ECU 28 further determines or calculates an operation timing targeted for the intake valve 15 (target operation timing) based on the target overlap angle OVP. The internal combustion engine 1 realizes the target overlap angle OVP by varying the operation timing of the intake valve 15 based on the actual operation timing obtained by the calculation. That is, the ECU 28 adjusts the overlap angle, or valve overlap period of the intake valve 15 and exhaust valve 16, by controlling the operation timing of the intake valve 15.

More specifically, the ECU 28 determines the target overlap angle OVP in accordance with operation conditions of the internal combustion engine 1. The ECU 28 determines or calculates the target operation timing for the intake valve 15 so that the internal combustion engine 1 can achieve the target overlap angle OVP. The ECU 28 also determines or calculates a displacement angle of the intake camshaft 17 (target displacement angle INP) required to achieve the target operation timing for the intake valve 15 based on the actual displacement angle (actual displacement angle INR) of the intake camshaft 17.

By controlling the intake camshaft 17 based on the target displacement angle INP, the target overlap angle OVP is achieved in accordance with the operation conditions.

The displacement angle represents a relative rotation amount of the intake camshaft 17 and exhaust camshaft 18 with respect to the timing pulleys P1 and P2. The displacement angle is a value converted to a crank angle (° CA). The ECU 28 calculates the actual displacement angle INR of the intake camshaft 17 and actual displacement angle of the exhaust camshaft 18 based on detection signals from the intake cam angle sensors 26 and 27 and the crank angle sensor 25.

In the preferred embodiment, the displacement angle of the intake camshaft 17 represents how much the operation timing of the intake valve 15 is advanced from the most retarded timing. The exhaust camshaft is designed not to vary the operation timing of the exhaust valve. That is, the displacement angle of the exhaust camshaft is fixed (0° CA) and is not advanced or retarded.

Figure 2:
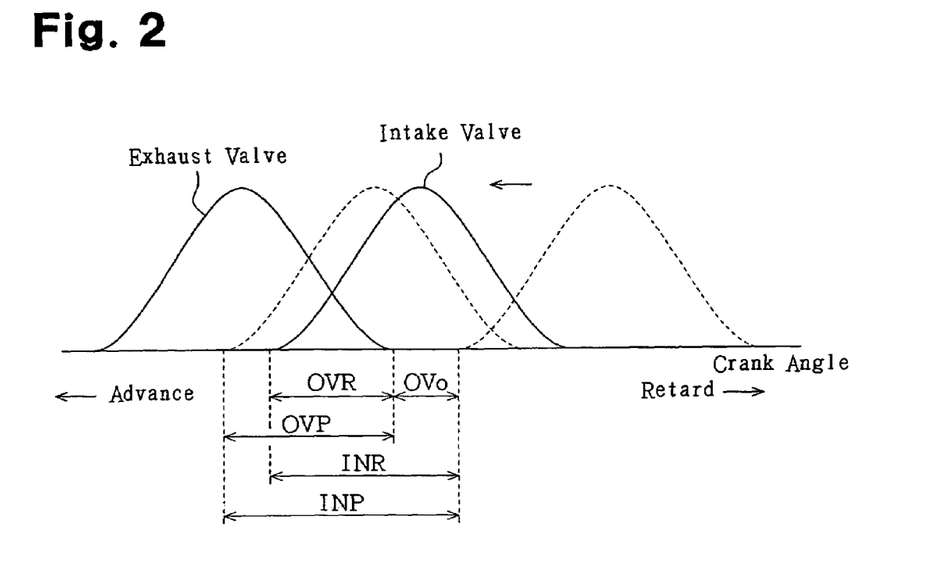
FIG. 2 is a graph showing valve timing overlap control in the preferred embodiment of the present invention, with the vertical axis representing the open degree of intake and exhaust valves and the horizontal axis representing the displacement angle of the valves.

The overlap angle of the intake camshaft 17 and the exhaust camshaft 18 will now be described with reference to FIG. 2. The overlap angle when the displacement angle of the intake camshaft 17 and the displacement angle of the exhaust camshaft are both 0° CA is an initial value $OV_0$. When the crankshaft is rotated by crank angle $\theta C$ during the time period from the closing of the exhaust valve 16 to the opening of the intake valve 15, the valve overlap angle is $-\theta C$. This valve overlap angle is also represented by crank angle (° CA). When the intake camshaft 17 is advanced by the actual displacement angle INR from the initial condition (when the overlap angle is the initial value $OV_0$), the actual overlap angle OVR of the intake valve 15 and the exhaust valve 16 is expressed by the next equation (1).

$$OVR = INR - OV_0 \tag{1}$$

In equation (1), when the intake camshaft 17 is advanced, the actual displacement angle INR is a positive value. When the intake camshaft 17 is retarded, the actual displacement angle INR is a negative value.

Figure 3:
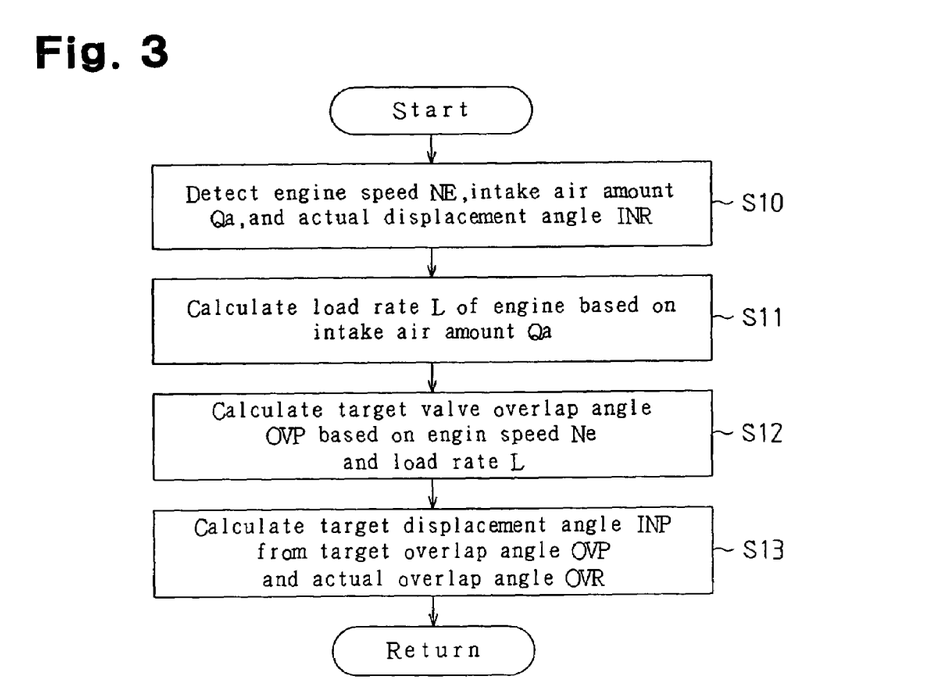
FIG. 3 is a flowchart showing the procedure for calculating the displacement angle of the intake valve.

The calculation of the target displacement angle INP by the ECU 28 will now be described with reference to the flowchart of FIG. 3. The ECU 28 executes the processing shown in the flowchart of FIG. 3 in predetermined time interrupts.

In step S10, the ECU 28 detects, in predetermined time intervals, the engine speed NE based on a detection signal from the crank angle sensor 25. Further, the ECU 28 detects the intake air amount Qa and the actual displacement angle INR of the intake camshaft 17 based on detection signals from the airflow meter AM and the intake cam angle sensor 26. The ECU 28 detects the actual displacement angle (0° CA) of the exhaust camshaft 18 based on a detection signal from the exhaust cam angle sensor 27. The actual displacement angle INR is the actual displacement angle of the intake camshaft 17.

In step S11, based on the detected intake air amount Qa, the ECU 28 calculates a load rate L, which indicates the engine load. The load rate L is calculated from the next equation (2). In equation (2), Qwot is a constant stored in the ROM and representing an intake air amount when the engine is in a full load state.

$$L = Qa/Qwot \tag{2}$$

In step S12, the ECU 28 calculates the target overlap angle OVP based on the engine speed NE, the load rate L, and the map stored in the ROM.

In step S13, the ECU 28 determines or calculates the target displacement angle INP of the intake camshaft 17 from the target overlap angle OVP and the actual overlap angle OVR. Since the displacement angle of the exhaust camshaft 18 is fixed (0° CA), the target displacement angle INP is determined or calculated from the next equation (3)

$$INP=INR+(OVP-OVR) \quad (3)$$

Steps S10 to S13 are repeated in predetermined time intervals. The IN-VVT mechanism 19 is controlled so that the actual displacement angle INR of the intake camshaft 17 matches the target displacement angle INP. The control is executed by the ECU 28, which sets the duty ratio of the voltage applied to the OCV 24 in accordance with the difference between the actual displacement angle INR and the target displacement angle INP to converge the actual displacement angle INR to the target displacement angle INP.

Figure 4:
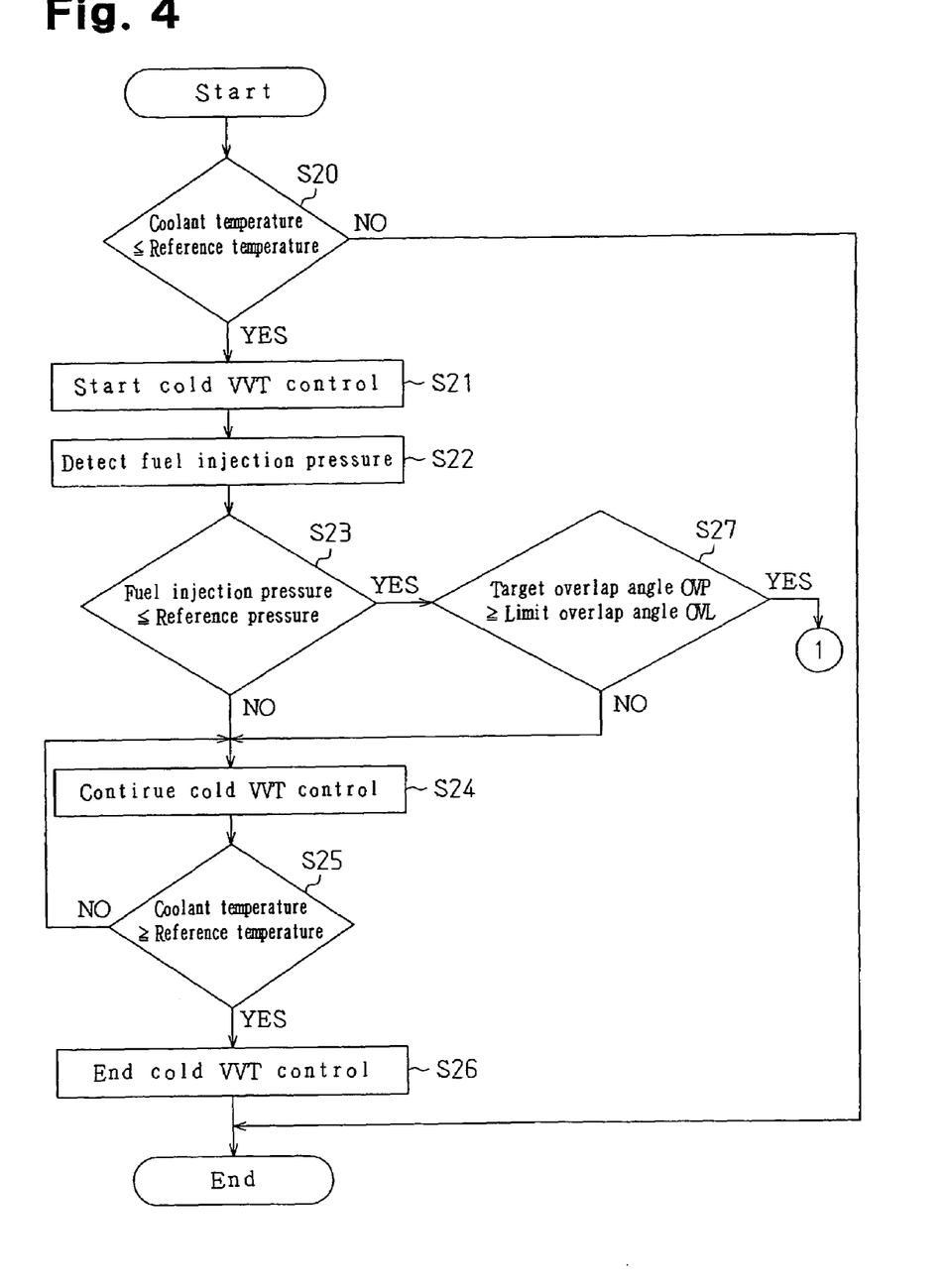
FIG. 4 and FIG. 5 are flowcharts of a cold VVT control.
Figure 5:
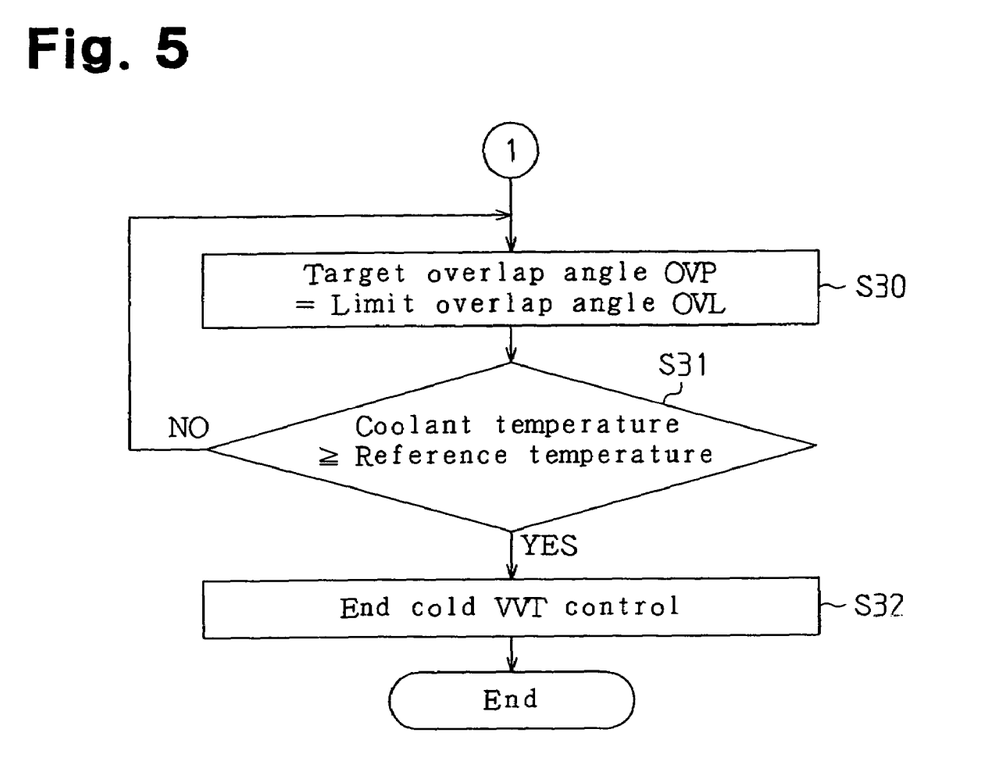

Next, referring to FIGS. 4 and 5, cold VVT control executed by the ECU 28 when starting the internal combustion engine 1 will now be described. The ECU 28 executes the cold VVT control with the IN-VVT mechanism 1 to advance the operation timing of the intake valve 15 so that the operation timing of the intake valve 15 overlaps with the operation timing of the exhaust valve 16. This raises the temperature in the cylinder 3. In this manner, the temperature in the cylinder 3 is prevented from falling even if the fuel injection pressure of the fuel injection valve 14 is lower than the target pressure when starting the internal combustion engine 1. Therefore, the internal combustion engine 1 is driven in the engine safety mode without combustion deterioration.

In step S20, when the internal combustion engine 1 is started, the ECU 28 compares the coolant temperature in the internal combustion engine 1 with a reference temperature stored in the ROM. The reference temperature is a reference for determining whether the temperature in the cylinder 3 has been raised appropriately to realize optimal combustion in the internal combustion engine 1. Further, the reference temperature is, for example, the coolant temperature when the internal combustion engine 1 is started. If the coolant temperature is higher than the reference temperature, the ECU 28 determines that the temperature in the cylinder 3 has been raised and appropriate combustion is being carried out. In this case (NO in step S20), the cold VVT control is not executed, and the processing of FIG. 4 temporarily ends.

Conversely, if the coolant temperature detected in the internal combustion engine 1 is lower than the reference temperature (YES in step S20), the ECU 28 determines that the temperature in the cylinder 3 is not high enough to maintain a satisfactory combustion state. Thus, the ECU 28 starts the cold VVT control (step S21). The cold VVT control raises the temperature in the cylinder 3 by advancing the intake valve 15 to overlap the operation timing of the intake valve 15 with that of the exhaust valve 16.

In step S22, the ECU 28 obtains the fuel injection pressure of the fuel injection valve 14. In step S23, the ECU 28 compares the fuel injection pressure of the fuel injection valve 14 detected by the pressure sensor FPS with the reference injection pressure stored in the ROM. The reference injection pressure is a reference value for determining optimal fuel injection conditions for the fuel injection valve 14 and is based on calculations or experiments. If the detected fuel injection pressure of the fuel injection valve 14 is lower than the reference injection pressure, the ECU 28 determines that there is anomaly, such as clogging, in the fuel supply system, which includes the fuel injection valve 14. Conversely, if the detected fuel injection pressure is higher than the reference injection pressure, the ECU 28 determines that fuel is being injected from the fuel injection valve 14 with the appropriate fuel injection pressure.

When the detected pressure of the fuel supplied to the fuel injection valve 14 is higher than the reference injection pressure (NO in step S23), the ECU 28 determines that even though the temperature of the cylinder 3 is low, fuel is being injected at an appropriate fuel injection pressure and continues the cold VVT control (step 24). Accordingly, the temperature of the cylinder 3 rises gradually. In step S25, the ECU 28 compares the coolant temperature of the internal combustion engine 1 with the reference temperature at fixed time intervals. If the coolant temperature is higher than the reference temperature (YES in step 25), the ECU 28 determines that the temperature in the cylinder 3 has been raised by the cold VVT control and that combustion is being carried out appropriately. In this state, there is no need to further execute cold VVT. Thus, the ECU 28 ends the cold VVT control (step S26).

If the detected coolant temperature is lower than the reference temperature (NO in step 25), the ECU 28 determines that the temperature in the cylinder 3 has not been raised sufficiently. Thus, the ECU 28 continues the cold VVT control until the coolant temperature becomes higher than the reference temperature (step S24).

If the detected fuel injection pressure is lower than the reference injection pressure (YES in step S23), the ECU 28 determines that the fuel injection pressure has decreased due to an anomaly in the fuel supply system and that a satisfactory combustion state cannot be ensured. In this case, the ECU 28 compares the target overlap angle OVP with a limit overlap angle OVL, which is stored in the ROM (step S27). The limit overlap angle OVL is the limit overlap angle at which there is no combustion deterioration in the internal combustion engine 1 even if internal EGR is performed. Further, the limit overlap angle OVL is predetermined in associated with the coolant temperature of the internal combustion engine 1.

For example, the fuel injection pressure may be lower than the target pressure in a state in which the coolant temperature is high enough that internal EGR does not have to be performed. Thus, in such state, the limit overlap angle OVL is set so that the valve overlap angle is decreased to reduce the internal EGR amount. Conversely, the fuel injection pressure may be lower than the target pressure in a state in which the coolant temperature is so low that internal EGR must be performed. Thus, in such a state, the limit overlap angle OVL is set so that the advance angle amount is increased to increase the overlap angle, which, in turn, increases the internal EGR amount and enhances fuel vaporization. In other words, the ECU 28 varies the limit overlap angle OVL in accordance with the coolant temperature of the internal combustion engine 1 to set upper limit of the internal EGR amount according to the coolant temperature.

When the target overlap angle OVP is less than the limit overlap angle OVL (NO in step S27), the ECU 28 determines that no problem will occur if the cold VVT control is executed in accordance with the target overlap angle OVP. Thus, the ECU 28 continues the cold VVT control (step S24).

When the target overlap angle OVP is greater than the limit overlap angle OVL (YES in step S27), the ECU 28 determines that combustion deterioration will occur if the cold VVT control is performed in accordance with the target overlap angle OVP. In this case, the ECU 28 sets the target overlap angle OVP to be equal to the limit overlap angle OVL (step S30). Therefore, IN-VVT mechanism 19 operates to match the overlap angle and the limit overlap angle OVL in order to vary the operation timings of the intake valve 15 and the exhaust valve 16. That is, the ECU 28 adjusts the operation timings of the intake valve 15 and the exhaust valve 16 (degree of overlap) based on the limit overlap angle OVL to restrict the increase of the internal EGR amount and to increase the proportion of fresh air amount in the internal combustion engine 1 without causing combustion deterioration in the internal combustion engine 1.

In step S31, the ECU 28 again compares the detected coolant temperature with the reference temperature. If the detected coolant temperature is higher than or equal to the reference temperature (YES in step S31), the ECU 28 determines that the temperature in the cylinder 3 is high enough and that further cold VVT control is not required. In this case, the ECU 28 ends the cold VVT control and continues operation of the internal combustion engine 1 (step S32).

If the detected coolant temperature is lower than the reference temperature (NO in step S31), the ECU 28 continues the cold VVT control with the target overlap angle OVP equalized with the limit overlap angle OVL. The ECU 28 operates the internal combustion engine 1 in this manner until the detected coolant temperature becomes higher than the reference temperature.

The valve overlap angle is limited at the limit overlap angle OVL in the series of processes described above. This enables the internal combustion engine 1 to be operated in the engine safety mode while minimizing combustion deterioration even if the temperature in the cylinder 3 is low or the fuel injection pressure of the fuel injection valve 14 is low because of an anomaly in the fuel supply system when the internal combustion engine 1 is started.

According to the preferred embodiment, the advantages as described below can be obtained.

(1) The ECU 28 controls the internal combustion engine 1 when starting the engine 1 based on the limit overlap angle OVL when the temperature in the cylinder 3 is low and the fuel injection pressure of the fuel injection valve 14 is low (step S27).

Thus, by controlling the internal combustion engine 1. based on the limit overlap angle OVL, the operation timing of the intake valve 15 is overlapped with the operation timing of the exhaust valve 16 without causing combustion deterioration in the internal combustion engine 1.

As a result, even if the fuel injection pressure of the fuel injection valve 14 is low due to an anomaly in the fuel supply system, the ECU 28 drives the internal combustion engine 1 in the engine safety mode without causing combustion deterioration until the internal combustion engine 1 generates the necessary output by reducing the internal EGR amount to increase the proportion of the amount of fresh air in the internal combustion engine 1 (steps S30 to S32).

(2) The ECU 28 determines the limit overlap angle OVL from the map data stored in the ROM based on the coolant temperature in the internal combustion engine 1 and the predetermined reference temperature. Therefore, the ECU 28 optimally controls the internal combustion engine 1 by using the limit overlap angle OVL, which is determined based on the combustion state of the internal combustion engine 1.

It should be apparent to those skilled in the art that the present invention may be embodied in many other specific forms without departing from the spirit or scope of the invention. Particularly, it should be understood that the present invention may be embodied in the following forms.

The EGR controller is applicable not only to the direct injection type internal combustion engine 1 but also to a port injection type internal combustion engine.

In the preferred embodiment, during the engine safety mode, the internal EGR amount is restricted by equalizing the target overlap angle OVP with the limit overlap angle OVL. Instead, the EGR amount may be restricted, for example, by setting a target value for the EGR amount and subtracting a predetermined amount. Further, internal EGR may be prohibited during the engine safety mode.

The amount (EGR amount) of exhaust gas returned to the combustion chamber refers to at least one of the amount of exhaust gas recirculated from the exhaust passage 13 to the combustion chamber 8 and the amount of combustion gas recirculated from the combustion chamber 13 to the intake port 10.

The EGR controller of the preferred embodiment is applied to a so-called internal EGR type internal combustion engine 1 but may also be applied to an external EGR type internal combustion engine. An external EGR type internal combustion engine includes, for example, an EGR passage connecting an intake port 10 and an exhaust port 11 and a flow control valve arranged in the EGR passage. The EGR controller may control the open degree of the flow control valve to restrict the amount of returned exhaust gas.

In the preferred embodiment, the overlap angle is adjusted by varying the operation timing. Instead, the overlap angle may be adjusted by varying the valve lift amount (valve displacement amount).

The amount of returned internal exhaust gas is decreased by shortening the valve overlap period of the intake valve and the exhaust valve. However, the amount of returned internal exhaust gas may also be decreased by varying the valve lift amount of the intake valve or the exhaust valve as required. If the lift amount of the exhaust valve is reduced, the amount of returned internal exhaust gas will be effectively reduced.

The type of the internal combustion engine 1 is not limited. For example, the engine 1 may be a gasoline engine or a diesel engine.

In the preferred embodiment, the decrease in fuel injection pressure, enabling operation in the engine safety mode, is detected by the pressure sensor FPS. Instead, this detection may be performed by using a system that detects an anomaly in the fuel injection pressure such as that described in the prior art (Japanese Patent Publication No. 10-299557).

The ECU 28 may perform the cold VVT control by varying the operation timing of the exhaust valve 16 in addition to varying the operation timing of the intake valve 15. Alternatively, the ECU 28 may perform the cold VVT control by varying only the operation timing of the exhaust valve 16.

The EGR controller of the present invention is also applicable to an internal combustion engine having a mechanism for varying valve characteristics of either intake valves or exhaust valves.

The present examples and embodiments are to be considered as illustrative and not restrictive, and the invention is not to be limited to the details given herein, but may be modified within the scope and equivalence of the appended claims.

What is claimed is:

1. An exhaust gas recirculation controller for recirculating some of exhaust gas to a combustion chamber of an internal combustion engine having a fuel injection valve for injecting fuel, the exhaust gas recirculation controller comprising:

a detection means for detecting fuel injection pressure of the fuel injection valve; and a restriction means for adjusting the amount of exhaust gas returned to the combustion chamber, the restriction means restricting the amount of returned exhaust gas when the detected fuel injection pressure is lower than a target injection pressure.

2. The exhaust gas recirculation controller according to claim 1, wherein the fuel injection valve directly injects the fuel into the combustion chamber.

3. The exhaust gas recirculation controller according to claim 1, wherein the restriction means has an upper limit for the amount of returned exhaust gas, and when the amount of returned exhaust gas exceeds the upper limit, adjusts the amount of returned exhaust gas to equalize the amount of returned exhaust gas with the upper limit.

4. The exhaust gas recirculation controller according to claim 3, wherein the restriction means varies the upper limit amount of returned exhaust gas in accordance with the temperature of the internal combustion engine.

5. The exhaust gas recirculation controller according to claim 1, wherein the restriction means restricts the amount of returned exhaust gas when temperature of the internal combustion engine is less than or equal to a reference temperature.

6. The exhaust gas recirculation controller according to claim 1, wherein:
the internal combustion engine includes an intake valve, an exhaust valve, and a variable mechanism for varying the operation characteristic of at least one of the intake valve and the exhaust valve; and
the restriction means adjusts the amount of returned exhaust gas by varying the operation characteristic of at least one of the valves with the variable mechanism.

7. The exhaust gas recirculation controller according to claim 6, wherein the restriction means has a target overlap period that is determined in accordance with an operation condition of the internal combustion engine and varies the operation characteristic of at least one of the intake valve and the exhaust valve so that an overlap period during which the intake valve and the exhaust valve are both open is shorter than the target overlap period.

8. The exhaust gas recirculation controller according to claim 6, wherein the variable mechanism alters the phase of the camshaft relative to the crankshaft to vary opening and closing timing of at least one of the valves.

9. The exhaust gas recirculation controller according to claim 1, wherein the restriction means reduces the amount of returned exhaust gas when the fuel injection pressure is lower than the target injection pressure.

10. An exhaust gas recirculation controller for recirculating some of exhaust gas to a combustion chamber of an internal combustion engine having a fuel injection valve for injecting fuel, the exhaust gas recirculation controller comprising:
a pressure sensor for detecting fuel injection pressure of the fuel injection valve; and
a restriction unit for adjusting the amount of exhaust gas returned to the combustion chamber, the restriction unit restricting the amount of returned exhaust gas when the detected fuel injection pressure is lower than a target injection pressure.

11. The exhaust gas recirculation controller according to claim 10, wherein the fuel injection valve directly injects the fuel into the combustion chamber.

12. The exhaust gas recirculation controller according to claim 10, wherein the restriction unit has an upper limit for the amount of returned exhaust gas, and when the amount of returned exhaust gas exceeds the upper limit, adjusts the amount of returned exhaust gas to equalize the amount of returned exhaust gas with the upper limit.

13. The exhaust gas recirculation controller according to claim 12, wherein the restriction unit varies the upper limit amount of returned exhaust gas in accordance with the temperature of the internal combustion engine.

14. The exhaust gas recirculation controller according to claim 10, wherein the restriction unit restricts the amount of returned exhaust gas when temperature of the internal combustion engine is less than or equal to a reference temperature.

15. The exhaust gas recirculation controller according to claim 10, wherein:
the internal combustion engine includes an intake valve, an exhaust valve, and a variable mechanism for varying the operation characteristic of at least one of the intake valve and the exhaust valve; and
the restriction unit adjusts the amount of returned exhaust gas by varying the operation characteristic of at least one of the valves with the variable mechanism.

16. The exhaust gas recirculation controller according to claim 15, wherein the restriction unit has a target overlap period that is determined in accordance with an operation condition of the internal combustion engine and varies the operation characteristic of at least one of the intake valve and the exhaust valve so that an overlap period during which the intake valve and the exhaust valve are both open is shorter than the target overlap period.

17. The exhaust gas recirculation controller according to claim 15, wherein the variable mechanism alters the phase of the camshaft relative to the crankshaft to vary opening and closing timing of at least one of the valves.

18. The exhaust gas recirculation controller according to claim 10, wherein the restriction unit includes a computer programmed to reduce the amount of returned exhaust gas when the fuel injection pressure is lower than the target injection pressure.

19. An EGR controlling method for recirculating some of exhaust gas to a combustion chamber of an internal combustion engine having a fuel injection valve for injecting fuel, the method comprising:
detecting fuel injection pressure of the fuel injection valve; and
adjusting the amount of exhaust gas returned to the combustion chamber in accordance with the detected fuel injection pressure, and decreasing the amount of returned exhaust gas when the detected fuel injection pressure is lower than a target injection pressure.

20. The method according to claim 19, wherein the internal combustion engine includes an intake valve, having a variable operation characteristic, and an exhaust valve, the method further comprising:
detecting temperature of the internal combustion engine; and
determining a target overlap period in accordance with an operation condition of the internal combustion engine;
wherein said adjusting the amount of exhaust gas returned to the combustion chamber is initiated when the temperature of the internal combustion engine is less than or equal to a reference temperature, and said adjusting including varying the operation characteristic of at least one of the intake valve and the exhaust valve so that an overlap period during which the intake valve and the exhaust valve are both open is shorter than the target overlap period.

* * * * *

UNITED STATES PATENT AND TRADEMARK OFFICE
CERTIFICATE OF CORRECTION

| | | |
|---|---|---|
| PATENT NO. | : 7,059,309 B2 | Page 1 of 1 |
| APPLICATION NO. | : 11/057166 | |
| DATED | : June 13, 2006 | |
| INVENTOR(S) | : Mitsuhiro Nomura | |

It is certified that error appears in the above-identified patent and that said Letters Patent is hereby corrected as shown below:

In the Title Page, Item (56) under U.S. PATENT DOCUMENTS:
      change "6,810,866 B1" to --6,810,866 B2--.
      change "6,917,874 B1" to --6,917,874 B2--.
Under FOREIGN PATENT DOCUMENTS:
      change "11-066458" to --11-006458--.

| Column | Line | |
|---|---|---|
| 9 | 42 | After "engine 1" delete ".". |

Signed and Sealed this

Sixth Day of November, 2007

JON W. DUDAS
*Director of the United States Patent and Trademark Office*